United States Patent
Kobayashi et al.

(10) Patent No.: US 7,353,863 B2
(45) Date of Patent: Apr. 8, 2008

(54) METHOD OF SURFACE TREATING ALUMINUM ALLOY BASE BODY OF HEAT EXCHANGER AND HEAT EXCHANGER PRODUCED BY THE METHOD

(75) Inventors: Kengo Kobayashi, Ama-gun (JP); Osamu Kasebe, Okazaki (JP); Hiroyoshi Sugawara, Anjo (JP); Kazuhisa Uchiyama, Nagoya (JP); Kenji Karube, Atsugi (JP); Kazunari Hamamura, Tsukui-gun (JP); Kensuke Shimoda, Ebina (JP)

(73) Assignee: Denso Corporation, Kariya (JP)

( * ) Notice: Subject to any disclaimer, the term of this patent is extended or adjusted under 35 U.S.C. 154(b) by 580 days.

(21) Appl. No.: 10/844,610

(22) Filed: May 12, 2004

(65) Prior Publication Data

US 2004/0256089 A1 Dec. 23, 2004

(30) Foreign Application Priority Data

May 13, 2003 (JP) ............................. 2003-134636

(51) Int. Cl.
*F28F 13/18* (2006.01)
*C23C 22/56* (2006.01)
*B21D 53/06* (2006.01)

(52) U.S. Cl. .............. 165/133; 165/134.1; 29/890.045; 148/257

(58) Field of Classification Search ................ 165/133, 165/134.1; 29/890.03, 890.045, 890.46; 148/272, 251, 275
See application file for complete search history.

(56) References Cited

U.S. PATENT DOCUMENTS

| | | | | |
|---|---|---|---|---|
| 2,593,449 A | * | 4/1952 | Hesch | 216/104 |
| 2,885,273 A | * | 5/1959 | Oelgoetz et al. | 216/49 |
| 4,395,303 A | * | 7/1983 | Weir | 216/55 |
| 5,137,067 A | * | 8/1992 | Espeut | 165/133 |
| 5,330,558 A | * | 7/1994 | McCormick et al. | 75/715 |
| 5,538,078 A | * | 7/1996 | Mizuno et al. | 165/133 |
| 6,306,226 B1 | * | 10/2001 | Iino et al. | 148/247 |

FOREIGN PATENT DOCUMENTS

| | | |
|---|---|---|
| JP | 5-051765 | 3/1993 |
| JP | 6-12217 | 2/1994 |
| JP | 9-14889 | 1/1997 |
| JP | 11-12796 | 1/1999 |
| JP | 11-264088 | 9/1999 |
| JP | 2001-158983 | 6/2001 |

* cited by examiner

*Primary Examiner*—Tho Duong
(74) *Attorney, Agent, or Firm*—Harness, Dickey & Pierce, PLC

(57) ABSTRACT

A method of surface treating an aluminum alloy base body of an heat exchanger which method enables an etching procedure to be carried out uniformly and quickly and a corrosion-resistant chemical conversion coating to be formed, is effected by pretreating the Al heat exchanger base body with an aqueous pre-treating liquid having a pH of 9.0 or less, etching the pretreated base body with an aqueous alkaline solution having a pH of 9.0 or more, and then subjecting the etched base body to a chemical conversion treatment or a hydrophilicity-enhancing treatment.

3 Claims, 2 Drawing Sheets

METHOD OF SURFACE TREATING ALUMINUM ALLOY BASE BODY OF HEAT EXCHANGER AND HEAT EXCHANGER PRODUCED BY THE METHOD

TECHNICAL FIELD OF THE INVENTION

The present invention relates to a method of surface treating an aluminum alloy base body of a heat exchanger and a heat exchanger produced by the method. More particularly, the present invention relates to a method of surface treating a base body of a heat exchanger, for example, an air conditioner for a motor car, having aluminum alloy tubes and fins, and a heat exchanger produced by the method.

BACKGROUND ART

Currently, most aluminum alloy heat exchangers, particularly heat exchangers for air conditioners of motor cars, are produced by combining and bonding molded fins and tubes with each other by a vacuum brazing procedure (VB method) or a non-corrosive flux-brazing procedure. Usually, the aluminum alloy for the heat exchangers is selected from aluminum-magnesium alloys (NB method). The brazing conditions are variable in response to the types of the aluminum alloys and the brazing methods. Usually, the brazing procedure is carried out at a high temperature of 550° C. or more and, thus, an oxide layer is usually formed on the surfaces of the fins and tubes. Also, in the case where the VB method is applied, magnesium (Mg) contained as a gettering agent in the alloy works to destroy the oxide layer and is converted to magnesium oxide, and the resultant magnesium oxide adheres to the surfaces of the aluminum alloy base body. Therefore, the surfaces of the base body is covered with the magnesium oxides of Al and Mg. Further, in the case where the NB method is applied, it causes the non-corrosive flux to remain in a large amount on the surfaces of the base body. As mentioned above, the surfaces of the heat exchanger are in various conditions different from those of the pure aluminum oxide layer.

The surfaces of the aluminum alloy heat exchangers having the above-mentioned surface conditions are mostly subjected to a chemical conversion treatment and then a hydrophilicity-enhancing treatment, to impart a corrosion resistance or to impart an enhanced hydrophilicity to the heat exchangers, for example, evaporators of air conditioners of motor cars, for the purpose of preventing scattering of water droplets. To form the chemical conversion coating in a sound condition, the various types of oxides or flux must be removed from the surfaces of the heat exchanger in the above mentioned conditions. For this purpose, usually, a chemical etching procedure is applied to the heat exchanger surfaces before the chemical conversion treatment procedure. The chemical conversion procedures are disclosed in, for example, Japanese Examined Patent Publication No. 6-12217 (Patent document 1) and Japanese Unexamined Patent Publication No. 9-14889 (Patent document 2).

The chemical etching procedures for the aluminum alloys include a method using an aqueous acid solution and a method using an aqueous alkaline solution. In the case where the covering layer formed on the base body surfaces is composed of natural oxides, generally the etching procedure for the covering layer can be carried out by using the aqueous alkaline solution at a high etching rate with a high process efficiency. However, on the surfaces of the heat exchanger assembled by the vacuum brazing procedure, a magnesium (Mg) oxide layer is further generated, and the magnesium oxide has a poor solubility in the aqueous alkaline solution. Therefore, in this case, the etching procedure using the aqueous alkaline solution exhibits a low etching rate. Also, due to the poor solubility of the magnesium oxide in the aqueous alkaline solution, the etching effect on the magnesium oxide layer becomes uneven, and usually, the resultant etched surface exhibits a serious roughness. This etching result mostly causes the chemical conversion coatings formed by the chemical conversion procedure applied to the etched surfaces to be uneven and, thus, the properties, for example, corrosion resistance, of the chemical conversion coatings may be insufficient. Further, when the hydrophilicity-enhancing procedure is applied on the chemical conversion coating surfaces having the serious roughness, the resultant hydrophilic coatings have an uneven thickness and, thus, after a lapse of time, the chemical conversion coating laying under the hydrophilic layer may be partly exposed to the outside to cause the hydrophilicity of the heat exchanger surfaces to be uneven. To prevent this disadvantage, the hydrophilic layer must be formed in a large amount which may cause an economical disadvantage to occur.

Under the above-mentioned circumstances, as a pretreatment for the aluminum alloy heat exchangers, a pre-treatment with an aqueous acid solution is proposed. For example, Japanese Unexamined Patent Publication 2001-158983 (Patent document 3) discloses an acid cleaning agent for a chemical conversion coating of a heating exchanger, an acid cleaning method of a heat exchanger, a method of treating a heat exchanger and a heat exchanger. In the acid cleaning method, an aluminum alloy heat exchanger is cleaned with an aqueous acid solution containing at least one member selected from Fe, Ni, Co, Mo and Ce metals and/or salts of the metals and nitric acid or sulfuric acid. This method is effective to enhance the corrosion resistance of the heat exchanger. However, to increase the rate of cleaning due to etching with the acid, the concentration of the etching agent and the etching temperature must be increased. Particularly, in the case where sulfuric acid is used, a problem of corroding the etching apparatus with the acid cannot be avoided. To prevent the corrosion, a large investment is necessary. Also, when nitric acid is used, waste water delivered from the etching procedure contains a large amount of nitrogen which is undesirable in view of environmental pollution.

Further, Japanese Unexamined Patent Publication No. 11-264088 (Patent document 4) discloses a pretreatment method of a surface treatment for an aluminum alloy article which does not relate to the heat exchangers. In this method, an aluminum alloy article containing silicon (Si) is cleaned with an acid liquid comprising nitric acid, ammonium fluoride and acetic acid. This method is carried out at about room temperature. The treating liquid contains nitric acid and acetic acid each in a high concentration and thus the method is not preferable in view of a pollution of process environment and of a difficulty in treatment of waste liquid delivered from the method procedure.

Accordingly, a surface treatment method comprising an etching step with an aqueous alkaline solution, in which step a rapid treatment can be carried out while problems in the investment for equipment, the environmental pollution of the method procedure and the treatment of the delivered waste liquid can be avoided, and capable of forming a uniform chemical conversion coating which does not cause the hydrophilic property of the surface to be uneven, is strongly desired.

Japanese Unexamined Patent Publication No. 5-51765 (Patent document 5) discloses a surface treating method for an aluminum material having a surface oxide layer with an aqueous solution of an cheleting agent and an organic amine compound, to thereby removing the surface oxide layer.

Japanese Unexamined Patent Publication No. 11-12796 (Patent document 6) discloses a method of producing a surface-treatment aluminum material for a two-piece can. In this method, an aluminum or aluminum alloy material is subjected to an electrolysis treatment in an aqueous electrolytical solution comprising at least one member selected from boric acid, borate salt, adipic acid, tartarate salts, citrate salts and malonate salts, to thereby form a non-porous anodic oxidation coating having a water content of 5% or less on the aluminum or aluminum alloy surface, and then to a lamination of an organic resin coating/on the non-porous anodic oxidation coating.

Patent document 1: Japanese Examined Patent Publication No. 6-12217, pages 1 to 2
Patent document 2: Japanese Unexamined Patent Publication No. 9-14889, page 2
Patent document 3: Japanese Unexamined Patent Publication No. 2001-158983, page 2
Patent document 4: Japanese Unexamined Patent Publication No. 11-264088, page 2
Patent document 5: Japanese Unexamined Patent Publication No. 5-51765
Patent document 6: Japanese Unexamined Patent Publication No. 11-12796

DISCLOSURE OF THE INVENTION

The present invention was made to solve the above-mentioned problems of the prior arts. Particularly, an object of the present invention is to provide a surface treatment method for a heat exchanger made from an aluminum alloy, particularly a heat exchanger produced by a vacuum brazing procedure, which method comprises an etching step using an aqueous alkaline solution which step is advantageous in that the necessary investment for equipment is small and the environment for procedure is good in comparison with the etching procedure using an aqueous acid solution, to thereby realize an even and quick etching effect and enable an chemical conversion step which is applied after the etching step to form uniform chemical conversion coating having excellent corrosion resistance, and a heat exchanger produced by the method.

The inventors of the present invention have made an extensive investigation for means for solving the above-mentioned problems. As a result, it was found for the first time that, in the surface-treatment method for an aluminum alloy heat exchanger comprising an etching step using an aqueous alkaline solution, a step of bringing an aqueous liquid having a pH of 9 or less into contact with the above-mentioned heat exchanger, particularly the heat exchanger produced by a vacuum brazing procedure immediate before the etching process, enables the etching procedure, even when an aqueous alkaline solution is employed for the etching procedure, to be evenly and quickly effected, and the chemical conversion step applied after the etching step to form uniform chemical conversion coating having excellent resistance to corrosion. The present invention has completed on the basis of the above-mentioned finding.

The method of the present invention for surface treating an aluminum alloy base body of a heat exchanger comprises the steps of etching at least a portion of a base body of a heat exchanger comprising aluminum alloy tubes and fins with an aqueous alkali solution having a pH value of 9.0 or more; and applying a chemical conversion treatment or a hydrophilicity-enhancing treatment to the surface of the etched base body, which method further comprises a pre-treatment step in which, before the etching step is applied, an aqueous pre-treatment liquid having a pH value of 9.0 or less is brought into contact with an uncleaned surface of the base body to be etched.

In the surface-treatment method of the present invention, the aluminum alloy is selected from magnesium-containing aluminum alloys.

In the surface-treatment method of the present invention, the uncleaned surface of the aluminum alloy tubes and fins of the base body to be subjected to the pre-treatment step may have magnesium oxide cohered thereto.

In the surface-treatment method of the present invention, the aqueous pre-treatment liquid preferably has a temperature of 35 to 100° C. and a pH value of 4 to 9.

In the surface-treatment method of the present invention, the pre-treatment step is preferably applied for a time of 3 to 240 seconds.

In the surface-treatment method of the present invention, the aluminum alloy tubes and fins of the base body may be ones bonded to each other by a vacuum brazing procedure.

In the surface-treatment method of the present invention, in the vacuum brazing procedure for aluminum alloy tubes and fins of the base body, a getting agent comprising magnesium may be used to destroy an oxide layer formed on the surfaces of the aluminum alloy tubes and fins.

The aluminum alloy heat exchanger of the present invention is one produced by using the method of surface treating an aluminum alloy base body of a heat exchanger as mentioned above.

BEST MODE FOR CARRYING OUT THE INVENTION

Figure 1B:
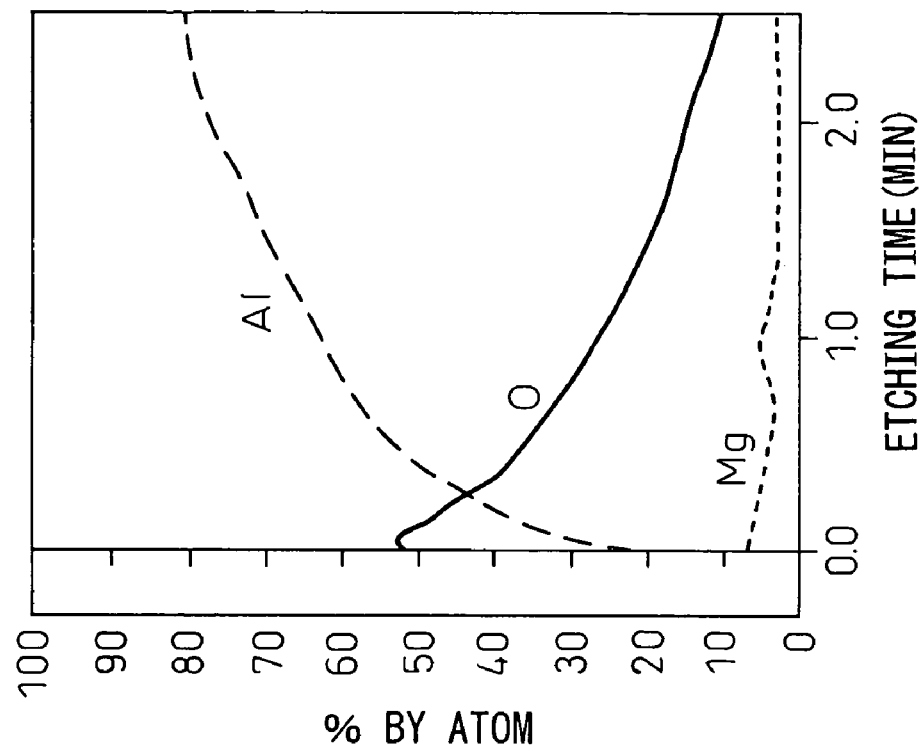
FIG. 1(B) is a graph showing a result of the XPS analysis of the same fin surface as in FIG. 1(A) after the fin surface is brought into contact with the aqueous treating liquid.

The method of the present invention for surface-treating an aluminum alloy base body of a heat exchanger is characterized in that in a surface-treatment of a base body of a heat exchanger comprising fins and tubes produced by molding an aluminum alloy material, the base body is pre-treated by bringing an aqueous liquid having a pH of 9 or less, preferably 7 or less, more preferably 4 to 9 into contact with the base body, immediate before an etching procedure with an aqueous alkaline solution is applied to the base body.

The aluminum alloy usable for the present invention is preferably selected from magnesium-containing aluminum alloys, for example, aluminum-magnesium alloys and aluminum-magnesium-silicon alloys.

It is important that the aqueous liquid for the pretreatment step has a pH value adjusted to 9.0 or less. In the case where the base body of the heat exchanger is made from an aluminum-magnesium alloy material by a vacuum brazing procedure during which a magnesium oxide layer is formed on and adhered to the base body surfaces, and the pH of the aqueous liquid for the pretreatment step is more than 9.0, as the magnesium oxide layer exhibits a low solubility in the aqueous pretreatment liquid having a pH of more than 9.0, the pretreatment procedure cannot completely remove the magnesium oxide layer from the base body surfaces. Also, the remaining magnesium oxide layer on the base body surfaces prevents the base body surfaces being uniformly and quickly etched with the aqueous alkaline etching solution.

There is no specific limitation to the composition of the aqueous pretreatment liquid as long as the aqueous pretreatment liquid has a pH value of 9.0 or less. For example, purified water is preferably used as an aqueous pretreatment liquid, because the use of the purified water contributes to significantly decreasing a load on the equipment for the waste liquid treatment. In the case where the base body of the heat exchanger assembled by a vacuum brazing procedure is subjected to the method of the present invention, the magnesium oxide adhered to the base body surfaces is dissolved in the aqueous pretreatment liquid to cause the pH value of the aqueous pretreatment liquid to increase. To maintain the pH value of the aqueous pretreatment liquid in the range of 9.0 or less, the aqueous pretreatment liquid preferably contains at least one member selected from inorganic acids, for example, sulfuric acid and nitric acid; and organic acids, for example, acetic acid, propionic acid, oxalic acid, maleic acid, tartaric acid malic acid and citric acid, in a small amount. Also, in the case where after the etching procedure with an aqueous alkaline solution, a desmutting treatment with an acid solution is applied to the etched base body surface, a part of the waste water delivered from the desmutting procedure is mixed into the aqueous pretreatment liquid to maintain the pH value thereof in the desired range.

For a purpose of imparting a high penetrating property to the aqueous pretreatment liquid in response to the roughness and form of the surfaces of the base body of the heat exchanger, a surfactant is mixed in the aqueous pretreatment liquid. The addition of the surfactant enables the etching procedure with the aqueous alkaline solution to be smoothly carried out with an enhanced uniformity. Further, for a purpose of enhancing the removing efficiency of magnesium, etc. from the surfaces of the base body of the heat exchanger, a cheleting agent consisting of at least one member selected from, for example, citric acid, oxalic acid, tartaric acid, gluconic acid and salts of the above-mentioned acids may be added to the aqueous pretreatment liquid. In the case where the aqueous pretreatment liquid contains hydrochloric acid or sodium chloride, and washing procedures in the succeeding procedures are insufficiently carried out and chloride ions may remain on the aluminum alloy base body surfaces of the heat exchanger so as to affect on the corrosion resistance of the resultant final product, although the hydrochloric acid or the sodium chloride do not affect on the uniform and quick etching effect of the aqueous alkaline solution. Thus, the content of chloride iron source in the aqueous pretreatment liquid is preferably decreased to as low as possible.

When the pH value of the aqueous pretreatment liquid is maintained in the range of 9 or less, preferably from 4 to 9, the temperature of the aqueous pretreatment liquid is preferably in the range of from 35 to 100° C., more preferably 40 to 80° C. When the temperature of the aqueous pretreatment liquid is less than 30° C., and the heat exchanger is one produced by a vacuum brazing procedure, the resultant aqueous pretreatment liquid may exhibit an insufficient activity for removal-promotion of the magnesium oxide layer adhered to the base body surfaces, and thus the uniform and quick etching procedure may be hindered.

The time of contact of the aqueous pre-treatment liquid with the heat exchanger base body is preferably in the range of from 3 to 240 seconds, more preferably from 5 to 60 seconds. If the contact time is less than 3 seconds, and when the heat exchanger is formed by a vacuum brazing procedure, the removal of the magnesium oxide layer from the base body surfaces may be insufficient, and thus the etching procedure with the aqueous alkaline solution may not be conducted uniformly and quickly. If the contact time is more than 240 seconds, the effects of the pretreatment may be saturated and an economical disadvantage may occur, although the effect on the base body surfaces, due to contact with the pretreatment liquid, does not change.

In the etching step of the method of the present invention, there is no limitation to the component of the aqueous alkaline solution for the etching, as long as the aqueous alkaline solution is a strong alkaline solution having a pH value of 9.0 or more preferably more than 9.0. As an aqueous alkaline solution for the etching procedure, an alkaline degreasing agent comprising, in addition to a builder component, a surfactant and/or a cheleting agent and available in the trade, is preferably utilized.

After the etching procedure with the aqueous alkaline solution, the etched base body surfaces are preferably subjected to a washing (desmutting) procedure with an acid solution to remove concentrated alloying metal components (smuts) from the etched base body surfaces. The acids usable for this procedure include sulfuric acid and nitric acid. The acid-washing (desmutting) procedure can be fully effected at room temperature, and the content of the acid in the acid solution is 10% by mass or less which is high enough in practice.

The acid-washing (desmutting) procedure is followed by a chemical conversion treatment or a hydrophilicity-enhancing treatment. The chemical conversion treatments includes conventional chromate conversion treatments, using, for example, a chromic acid chromating agents, phosphoric acid chromating agents, or alkali chromating agents; conventional zirconium chemical conversion treatment, using, for example, zirconium phosphate, zirconium oxide, tannic acid-zirconium, resin-zirconium or phytic acid-zirconium conversion treatment agents; and conventional titanium chemical conversion treatments using titanium phosphate, titanium oxide, resin-titanium, tannic acid-titanium, and phytic acid-titanium conversion treatment agents.

In place of or after the chemical conversion treatment, a hydrophilicity-enhancing treatment is applied to the base body surfaces of the heat exchanger. The hydrophilicity-enhancing treatment can be carried out in accordance with conventional methods disclosed in, for example, Japanese Unexamined Patent Publication No. 9-14889 (Patent document 1) and Japanese Examined Patent Publication No. 6-12217 (Patent Document 2).

EXAMPLES

The present invention will be further explained by the following examples which are not intended to restrict the scope of the present invention in any way.

Examples 1 to 10 and Comparative Examples 1 and 2

In each of Examples 1 to 10 and Comparative Examples 1 and 2, a base body of a heat exchanger which comprised a plurality of magnesium-containing aluminum alloy fins and tubes connected to each other by a vacuum brazing procedure, was brought into contact with an aqueous pretreatment liquid under the pretreatment conditions as shown in Table 1; the pretreated base body was subjected to an etching procedure using the aqueous alkaline solution in the manner as shown below and then to a desmutting (acid-washing) procedure in the manner as shown below. Thereafter, the etched base body was subjected to a chemical conversion treatment and then to a hydrophilicity-enhancing treatment in the manner as shown below.

The resultant product was subjected to the tests as shown below.

(1) Step for Bringing the Base Body into Contact with an Aqueous Pretreatment Liquid Having a pH Value of 9 or Less In each of Examples 1 to 10, the base body was brought into contact with an aqueous pretreatment liquid having a pH value of 9 or less. In each of Comparative Examples 1 and 2, a pretreatment under the conditions as shown in Table 1 was applied to the base body, in place of the pretreatment with the aqueous pretreatment liquid having a pH value of 9 or less.

(2) Etching Treatment with an Aqueous Alkaline Solution

In each of Examples 1 to 10 and Comparative Examples 1 and 2, the magnesium-containing aluminum alloy base body of the heat exchanger was immersed in an aqueous alkaline solution prepared by dissolving 1% by mass of a strong alkaline degreasing agent (trademark: PALCLEAN 391, made by NIHON PARKERIZING CO.) in water, maintained at a temperature of 45° C. and having the pH value as shown in Table 1, for a time long enough to reach an etching amount of 1 g/m$^2$. The necessary etching time was recorded.

(3) Desmutting (Acid-Washing) Treatment

In each of Examples 1 to 10 and Comparative Examples 1 to 2, after the etching treatment with the above-mentioned aqueous alkaline solution was completed, the base body was immersed in an aqueous solution of 1% by mass of nitric acid at room temperature for 10 seconds, to remove the smut from the base body surfaces and then rinsed with city water.

(4) Chemical Conversion Treatment

In each of Examples 1 to 10 and Comparative Examples 1 and 2, the desmutted base body of the heat exchanger was immersed in a chemical conversion treatment liquid prepared by dissolving 2% by mass of a zirconium chemical conversion treatment agent (trademark: PALCOAT N405., made by NIHON PARKERIZING CO.) in water and maintained at a temperature of 50° C., for 60 seconds, to thereby form a zirconium chemical conversion coating on the base body surfaces.

(5) Hydrophilicity-Enhancing Treatment

In each of Examples 1 to 10 and Comparative Examples 1 and 2, the chemical conversion-treated base body of the heat exchanger was immersed in a hydrophilicity-enhancing treatment liquid having the same composition as that described in Example 1 of Japanese Unexamined Patent Publication No. 9-14889 as shown below, and maintained at a temperature of 25° C., for 30 seconds. The base body was taken out from the treatment liquid, dripped to remove an excessive portion of the treatment liquid adhered to the base body surfaces, and heat-dried in a hot air-circulating oven at a temperature of 140° C. for 20 minutes, to form a hydrophilic coating on the base body surfaces.

| Composition of hydrophilicity enhancing treatment liquid | |
|---|---|
| Polyacrylamide resin (made by DAIICH KOGYOSEIYAKU K.K.) | 100 parts by mass |
| Polyvinylsulfonic acid (made by NIHON SHOKUBAI K.K.) | 110 parts by mass |
| Nonionic water-soluble nylon containing polyethyleneoxide groups arranged in the skeleton thereof (made by TORAY K.K.) | 40 parts by mass |
| Cross-linking agent (chromium biphosphate) | 10 parts by mass |

(6) Tests and Evaluations

In each of Examples 1 to 10 and Comparative Example 1 and 2, a specimen of the resultant product was subjected to the following tests and evaluations.

(A) Corrosion Resistance

A fin portion of an aluminum alloy heat exchanger was subjected to a salt spray test using an aqueous corrosion salt solution comprising 50 g/liter of sodium chloride in water in accordance with JIS Z 2371-2000, for a testing time of 72 hours. Then, the degree of generation of white rust on the fin was observed by the naked eye and evaluated in percentage of white rusted area of the fin surface on the basis of the total surface of the fin surface, as follows

| Class | White rusted area (%) |
|---|---|
| 4 | 0 |
| 3 | Less than 10% |
| 2 | 10% or more but less than 30% |
| 1 | 30% or more |

(2) Hydrophilicity

A specimen (fin) was immersed in a purified water stream flowing at a flow rate of 0.5 liter/min. for 72 hours, then the contact angle of the fin surface with water was measured by using a contact angle meter (model: CA-X type, made by KYOWA KAIMEN-KAGAKU K.K.). The number of the testing points on the fin surface was ten. The hydrophilicity of the fin surface was represented by the resultant highest and lowest contact angles.

(3) Surface Analysis

A fin portion of a heat exchanger base body

To check the magnesium-removing effect on a fin portion of a heat exchanger base body, the surface portion of the fin, before and after the pretreatment with the aqueous pretreatment liquid was applied in Example 1, was analyzed in the direction of the thickness of the fin portion by an XPS (x-ray photoelectron spectroscopy) analysis using an XPS analyzer (model: ESCA850, made by SHIMAZU SEISAKUSHO). The results are shown in FIGS. 1(A) and (B).

Figure 2:
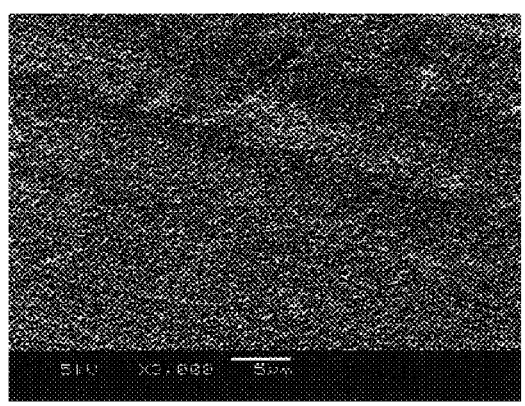
FIG. 2 is a photograph showing an SEM image of the fin surface of the heat exchanger after a chemical conversion treatment is applied in Example 1 of the present invention.
Figure 3:
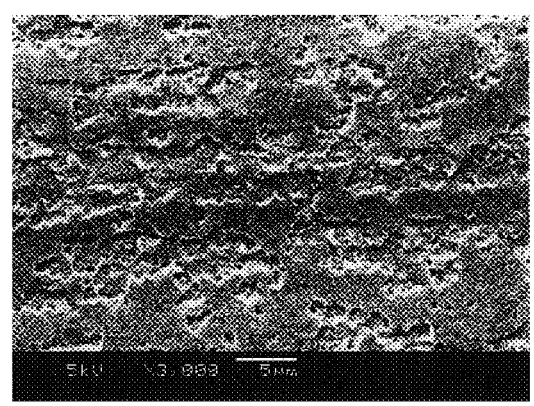
FIG. 3 is a photograph showing an SEM image of a fin surface after a chemical conversion treatment is applied in Comparative Example 1.

Further, the chemical conversion coating surfaces of base bodies of Example 1 and Comparative Example 1 were observed by a scanning electron microscope (model: JSM-5800, made by NIHON DENSHI K.K.). The resultant electrone microscopic photographs are shown in FIGS. 2 and 3.

The test results are shown in Tables 1 and 2.

pretreatment liquid was omitted, the etching rate was low and the resultant product exhibited a high scattering in the contact angles with water and a slightly low corrosion resistance. Also, in Comparative Example 2 in which the aqueous pretreatment liquid had a pH of 10.5, the resultant products exhibited unsatisfactory test results similar to those in Comparative Example 1.

Figure 1A:
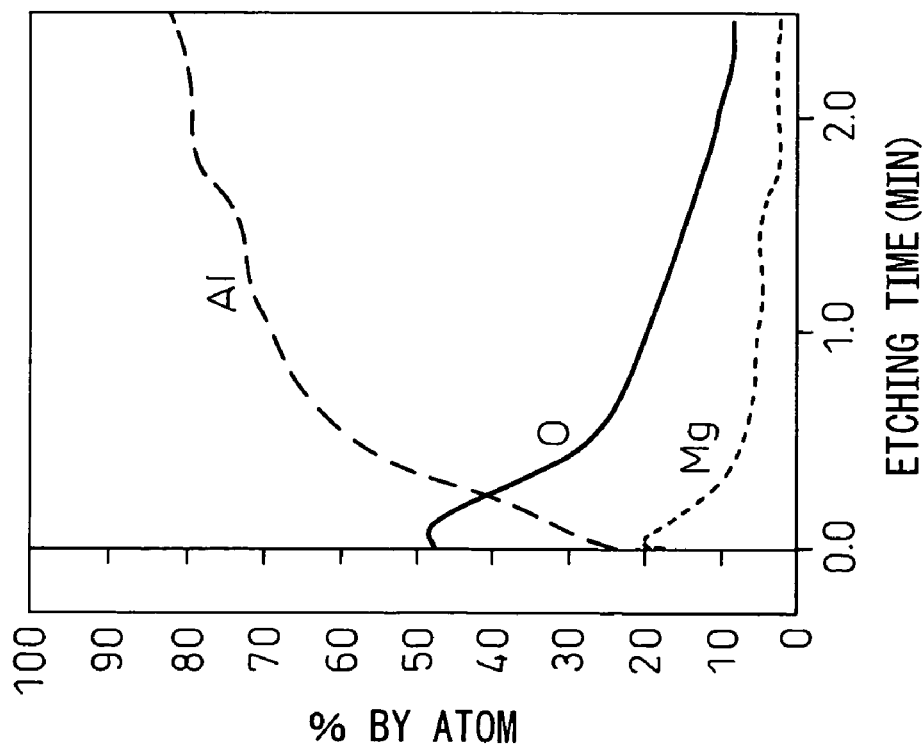
FIG. 1(A) is a graph showing a result of an XPS analysis of a surface of a fin of an aluminum alloy base body of a heat exchanger before bringing the heat exchanger into contact with an aqueous treating liquid having a pH of 9 or less for a pre-treatment, in Example 1 according to the present invention.

FIGS. 1(A) and 1(B) of the attached drawings show results of the XPS analysis of the fin part of the heat

TABLE 1

| | | Pretreatment step | | | | Etching step | |
|---|---|---|---|---|---|---|---|
| | | Composition of aqueous pretreatment | | Temperature | Time | | Temperature | Time (*)$_2$ |
| Example No. | | liquid | pH | (° C.) | (sec.) | pH | (° C.) | (sec.) |
| Example | 1 | Purified water | 7.0 | 70 | 30 | 12 | 45 | 60 |
| | 2 | Purified water | 7.0 | 40 | 240 | 12 | 45 | 60 |
| | 3 | Purified water | 7.0 | 80 | 3 | 12 | 45 | 65 |
| | 4 | Purified water | 7.0 | 30 | 240 | 12 | 45 | 75 |
| | 5 | Sodium acetate + Sodium hydroxide | 9.0 | 70 | 120 | 12 | 45 | 65 |
| | 6 | Diluted $H_2SO_4$ | 3.0 | 40 | 1 | 12 | 45 | 75 |
| | 7 | Diluted $H_2SO_4$ | 4.0 | 40 | 30 | 12 | 45 | 55 |
| | 8 | Diluted $H_2SO_4$ | 4.0 | 40 | 30 | 12 | 45 | 55 |
| | 9 | EO-addition-reacted non-ionic surfactant | 6.5 | 40 | 120 | 12 | 45 | 60 |
| | 10 | $Na_3$-NTA (*$_1$) + $H_2SO_4$ | 8.0 | 70 | 30 | 12 | 45 | 65 |
| Comparative | 1 | None | — | — | — | 12 | 45 | 100 |
| Example | 2 | Sodium acetate + sodium hydroxide | 10.5 | 70 | 30 | 12 | 45 | 95 |

[Note]
*$_1$ $Na_3$-NTA . . . Trisodium Nitrilotriacetate
(*)$_2$ Necessary time to reach an etching amount of 1 g/m$^2$

TABLE 2

| | | | | Contact angle (°) with water | | |
|---|---|---|---|---|---|---|
| | | Chemical conversion | Hydrophilicity-enhancing | | | Corrosion |
| Example No. | | treatment | treatment | Highest data | Lowest data | resistance |
| Example | 1 | Applied | Applied | 27 | 31 | 3 |
| | 2 | Applied | Applied | 22 | 34 | 3 |
| | 3 | Applied | Applied | 26 | 31 | 3 |
| | 4 | Applied | Applied | 21 | 33 | 3 |
| | 5 | Applied | Applied | 23 | 32 | 3 |
| | 6 | Applied | Applied | 20 | 34 | 3 |
| | 7 | Applied | Applied | 24 | 29 | 3 |
| | 8 | Applied | Applied | 25 | 30 | 3 |
| | 9 | Applied | Applied | 23 | 32 | 3 |
| | 10 | Applied | Applied | 26 | 31 | 3 |
| Comparative | 1 | Applied | Applied | 10 | 43 | 2 |
| Example | 2 | Applied | Applied | 14 | 48 | 2 |

As Tables 1 and 2 clearly show, in Examples 1 to 10 in which the aluminum alloy base bodies of the heat exchangers were brought into contact with the aqueous pretreatment liquids each having a pH value of 9 or less and then etched with an aqueous alkaline solution in accordance with the present invention, the etching treatment was sufficiently conducted at a high etching rate, and the resultant products exhibited a low scattering in the contact angles with water and excellent corrosion resistance.

Compared with the present invention, in Comparative Example 1 in which the pretreatment with the aqueous exchanger of Example 1 before and after the contact with the aqueous pretreatment liquid. The XPS analysis was conducted in the direction of the thickness of the fin. In comparison of FIG. 1(A) with FIG. 1(B), it was confirmed that the pretreatment with the aqueous pretreatment liquid in accordance with the present invention enabled the magnesium oxide to be removed from the fin surfaces of the heat exchanger.

Also, FIGS. 2 and 3 show the obervation results of the fin surfaces of the heat exchanger chemical conversion-treated in Example 1 and Comparative Example 1, by the scanning electron microscope. As shown in FIG. 2, the fin surfaces of the heat exchanger of Example 1 which was pretreated with the aqueous pretreatment liquid in accordance with the present invention was coated with a chemical conversion coating having high smoothness and uniformity. In Comparative Example 1, however, as shown in FIG. 3, the resultant chemical conversion coating had a plurality of deep pits and was not smooth and not uniform.

INDUSTRIAL APPLICABILITY

By applying the method of the present invention comprising a step of pretreatment with an aqueous pretreatment liquid having a pH of 9 or less, to an aluminum alloy base body of the thermal exchanger the base body can be rapidly etched with an aqueous alkaline solution and then uniformly coated with a chemical conversion coating.

The invention claimed is:

1. A method of surface treating an aluminum alloy base body of a heat exchanger, comprising the steps of etching at least a portion of a base body of a heat exchanger comprising aluminum alloy tubes and fins with an aqueous alkaline solution having a pH value of 9.0 or more; and applying a chemical conversion treatment or a hydrophilicity-enhancing treatment to the surface of the etched base body, wherein the aluminum alloy tubes and fins of the base body are those bonded to each other by a vacuum brazing procedure in which a getting agent comprising magnesium is used to destroy an oxide layer formed on the surfaces of the aluminum alloy tubes and fins, the method further comprises a pre-treatment step in which, before the etching step is applied, an aqueous pre-treatment liquid having a pH value of 9.0 or less is brought into contact with an unclean surface of the base body to be etched.

2. The surface-treatment method as claimed in claim 1, wherein the aqueous pre-treatment liquid has a temperature of 35 to 100° C. and a pH value of 4 to 9.

3. The surface-treatment method as claimed in claim 1, wherein the pre-treatment step is applied for a time of 3 to 240 seconds.

* * * * *